Oct. 25, 1966    I. C. LOVRET    3,281,510
METHOD AND APPARATUS FOR CONTINUOUSLY MOLDING A COMPOSITE
SANDWICH PANEL HAVING REGULAR INTERCONNECTING
VOIDS THEREIN
Filed Aug. 20, 1962      2 Sheets-Sheet 1
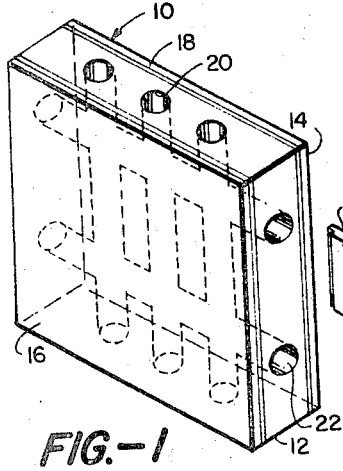
FIG.-1
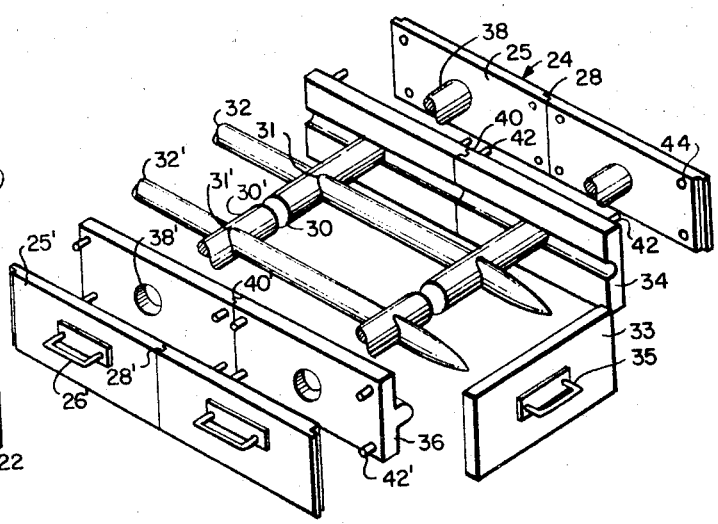
FIG.-2
FIG.-5
FIG.-4
FIG.-6
INVENTOR.
IVAR C. LOVRET
BY Edward O. Ansell
ATTORNEY

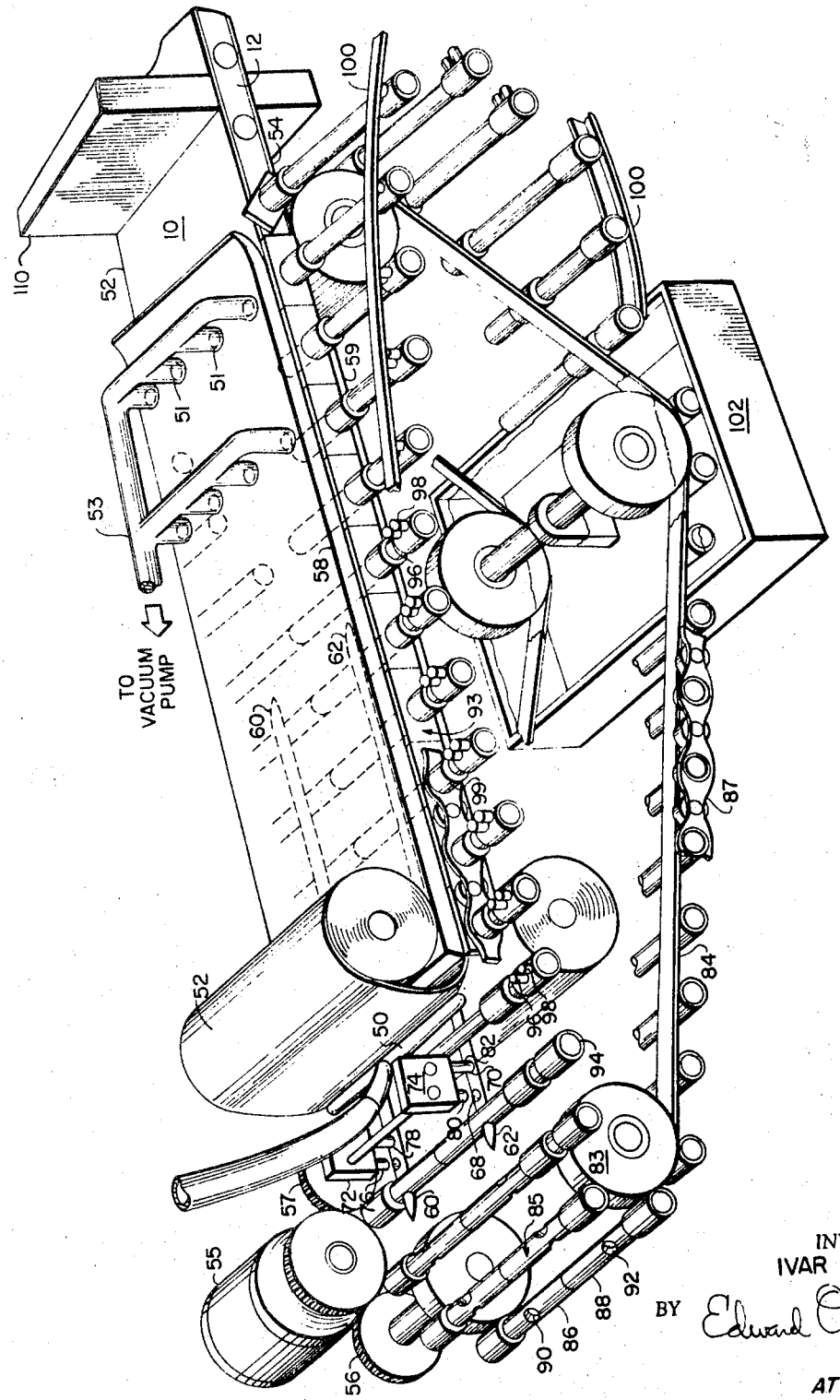

United States Patent Office 3,281,510
Patented Oct. 25, 1966

3,281,510
METHOD AND APPARATUS FOR CONTINUOUSLY MOLDING A COMPOSITE SANDWICH PANEL HAVING REGULAR INTERCONNECTING VOIDS THEREIN
Ivar C. Lovret, 2012 Yorba Drive, Pomona, Calif.
Filed Aug. 20, 1962, Ser. No. 217,889
20 Claims. (Cl. 264—47)

This invention relates generally to the fabrication of improved structural sandwich constructions, and specifically to the fabrication of such structures having plastic foam cores with interior passageways therein adapted to receive plumbing, electrical wiring and other utilities.

While most current building construction utilizes methods and materials known for thousands of years, recent progress has been made in the development of synthetic building materials utilizing lightweight metals and plastic foams. Foamed polystyrene sandwich panels, aluminum sheathed, have received strong endorsement as new cost-cutting construction material for residential building. Precut plywood panels with polystyrene foam cores are available for walls and roofs. Panels consisting of an exterior skin of wood siding, aluminum or porcelain-enameled steel, together with a rigid and fire resistant insulating core such as polystyrene plastic have been suggested for quick home erection at a low cost.

Use of such materials affords many advantages over present methods and materials utilized in building construction. For one, shorter time of erection provides great monetary advantages. Present hand-assembly methods force house prices up. By way of example, construction of walls, requires these individual steps: 2 x 4 studs and other framing members are assembled with extra cutting and fitting for door and window openings; exterior sheathing, siding, and 2 coats of paint are added; then insulation, wallboard or lath and plaster are provided, followed by interior trim and 2 coats of paint. The entire process may extend for weeks or months, and can be disrupted by bad weather for long periods of time until enough of the home is completed for inside work.

But with the use of panel materials, however, the building can be erected speedily and economically, saving on labor charges, financing costs, and allowing a quicker turnover of invested funds. Further, the materials contemplated are in many aspects superior to the sticks, mud water and sand presently utilized in home construction. A sandwich panel is smoother than a plaster wall. A plaster wall on studs will inevitably crack. With sandwich panels shrinkage, hence cracking, is avoided.

Known panels have one shortcoming, however. To be universally useful as walls, ceilings, or floors, they must contain passageways at convenient locations in the interior thereof to permit location of plumbing pipe, electrical conduit, gas or other utility lines, as well as air ducts for heating and air conditioning. As presently fabricated, these panels are made without such passageways altogether, or they must laboriously be provided in the foam core by another operation.

It is, therefore, the principal object of the present invention to provide a novel method of and improved means for the fabrication of structural sandwich construction cores having interior passageways located therein.

It is another object of the present invention to provide a novel method of and improved means for the production of structural sandwich constructions in continuous lengths.

And still another object of the present invention is to provide a novel method of and improved means for rapid and economical fabrication of composite building panels adapted to accommodate plumbing, electrical, gas and other utility lines, and air ducts for heating and air conditioning in the interior thereof.

In its broadest aspect, the present invention comprises a method of and apparatus for fabricating in continuous lengths foam cores for structural sandwich constructions having therein vertical and horizontal passageways for the placement of plumbing, gas, electrical conduit or other utilities, or to serve as air ducts for heating and air conditioning. In its broadest aspect the invention comprises the process of releasing a foamable composition about a mandrel structure in a confined space, the mandrel structure being stationary in part and moveable in part, said mandrel parts being in touching relationship relative to each other. The foamed core and the moveable mandrel part are moved together relative to the stationary mandrel part until the foam has become tack-free, and then the moveable mandrel part is removed from the foam core, and the foam core from the stationary mandrel part. Of course, this process can be mechanized as well as performed by hand, and structural sandwich constructions can be fabricated by the simple expedient of providing upper and lower face layers of sheet material to move together with the foamed core and moveable mandrel part, in adhering relation to the core, whereby a structural sandwich construction having regular and prearranged voids in the core thereof is formed.

A feature of the invention is the provision of means of and a method for detailing the foam core or structural panel. Another feature is the provision of improved means of and a method for achieving better distribution of mold release fluid over the mandrel parts. And another feature is the provision of a structure for the reloading of face layer rolls to assure uninterrupted and continuous practice of the process of fabricating structural sandwich constructions.

Further objects, features and advantages of the present invention will appear from the following description, taken in connection with the accompanying drawings in which preferred structural embodiments incorporating the principles of the present invention are shown by way of illustrative example, wherein:

FIG. 1 is a cut-away view in perspective of the product made by the method and apparatus of the present invention;

FIG. 2 is an exploded perspective view of one apparatus used in practicing the process of the present invention;

FIG. 3 is an overall perspective view of a mechanized apparatus used to fabricate structural sandwich constructions by the method of the present invention;

FIG. 4 is an enlarged view showing the cam-operated retainers operable to retain the longitudinal mandrel parts stationary as they are traversed by the lateral mandrel parts;

FIG. 5 is a sectional view of the longitudinal mandrel parts showing the internally pressurized flow system for improving the flow of mold-release fluid on the surface of the mandrel parts; and FIG. 6 shows an arrangement for reloading face layer rolls to provide continuous production of structural sandwich constructions.

Turning now to the figures, FIG. 1 shows a structural sandwich construction 10 which comprises a foam core center section 12 utilizing a plastic foam. The desirable characteristics for such a foam core include low density, a relatively short setting time, high compressive strength, and good fire resistance or retardation characteristics. A number of materials meet these requirements in varying degrees, and are thus suitable for utilization in the practice of the present invention. One suitable type is epoxy foams, which can be foamed in place, and which have found extensive use as core material in light sandwich structures for building doors, partitions and panels. Polystyrene foams are inexpensive, and easily processed at relatively low temperatures and pressures. Molded and self-expanding polystyrene foams have heretofore been used in sandwich constructions between sheets of aluminum and various plastics. Silicone foams can be used but the compressive strength is not as high as some of the other types. Rigid urethane foams, which are prepared by reacting hydroxyl-terminated compounds called polyols with a diisocyanate and water in the presence of a catalyst, are a popular material for this type of application. And ureaformaldehydes and vinyls are two other types of foams which can be utilized under the proper circumstances.

For a complete discussion of the various types of foams, their preparation, and characteristics, see Plastics Engineering Handbook of the Society of Plastic Industry, Inc., chapter 12, Cellular Plastics, page 136 et seq., third edition, 1960, Reinhold Publishing Corporation, New York, New York.

The two side surfaces of the foam core 12 are covered by outer face layers 14, 16 which serve as moisture proofing and protective members, and may also add to the structural strength making the composite sandwich impervious to moisture and physical damage. The face layers 14, 16 may be of plastic, aluminum, ferrous or non-ferrous metal, resinous material or glass and are bonded to the core 12 by a quick setting adhesive 18. Alternately, an adhesive could be mixed with foam, eliminating the requirement of an adhesive applicator in the fabrication of the sandwich. The layers may or may not be of material having sufficient compressive strength to also enable them to be load-bearing. The composite panel 10 is provided with vertical passageways 20 and horizontal passageways 22, which run generally parallel to the plane of the face layers 14, 16. The passageways 20, 22, in the form of voids, are for placement of plumbing and gas lines, electrical conduit or other utility lines or for use as ducts for heating and air conditioning. The vertical and horizontal passageways intersect to provide means for convenient arrangement of lines and conduit irrespective of the attitude of the panel and whether used as a wall, floor or roof. Note, for example, that at least one of the horizontal passageways is at approximately electrical outlet level. While the passageways are shown to be normal to each other, in certain instances, they could be oblique.

Referring now to FIG. 2, there is shown the novel mandrel means which allows me to fabricate by hand or machine, continuous lengths of foam core having therein, in regular and predetermined fashion, a plurity of internal and intercommunicating passageways adapted to receive pipes or conduit, or things of a like or similar nature, or to serve as air ducts. By simple adaptation, the mandrel means can enable provision of detailing in the foam core surfaces by practice of the same process. It is also possible to fabricate sandwich panels by simple modification of the same process, or to provide such panels by securing face layers by adhesive materials to the channeled cores, whether or not detailed, after the cores are completed.

The basic mandrel structure 24 comprises a pair of backing plates 25, 25' to which is perpendicularly attached a lateral half mandrel, 30, 30' respectively, the half mandrels being in butting relation. The backing plates are provided with a notch 28, 28' so that a plurality may be fitted together, and each is provided with a handle 26, 26' at the rear surface thereof for hand manipulation. Each lateral half mandrel 30, 30' is provided with a hole 31, 31' at an intermediate portion thereof through which is fitted a longitudinal mandrel 32, 32' in slidable relation. A Teflon bushing (not shown) or the like could be provided in the intermediate holes 31, 31' which would encompass the longitudinal mandrels 32, 32' and prevent wear of the surface of the hole and the longitudinal mandrels. A detachable plate 33 with a handle 35 may be provided to insure against axial movement by the longitudinal mandrels 32, 32'.

To form the foamed core having regular interconnecting voids, a foamable plastic composition is released around the mandrel structure 24, where it is laterally confined by the backing plates 25, 25'. The mandrel parts have previously been coated with a proper mold lubricant to achieve proper release. Vegetable and mineral oils and silicone fluids are effective for this, and can be swabbed or brushed or sprayed on if diluted with a suitable solvent. Zinc stearate powder can be dusted on, if desired. Caution must be exercised in making the selection of the proper agent, as an improper agent may affect the finish of the core by leaving spots, or cause crazing. The foam is allowed to initially set up and the lateral mandrels 30, 30' moved along the longitudinal mandrels 32, 32', carrying the foam core with them. When the foam has become tackfree, the foam core is removed from the longitudinal mandrels 32, 32', and the lateral half mandrels 30, 30' removed from the core, the latter being manipulated by the handles 26, 26' attached to the backing plates 25, 25' to which the lateral half mandrels are secured. What is formed thereby is a foam core, having voids therein which are regular and intersecting and which correspond to the position of the mandrels previously inserted therein. While passageways generally rectangular to each other are formed by manipulation of the mandrel structure shown, it is seen that oblique passageways can be formed by the simple expedient of attaching the lateral half mandrels 30, 30' to the backing plates 25, 25' so that the major axes thereof are at some other angle than 90 degrees to the plane of the backing plates.

If a structural sandwich structure is desired, face layers of metal or plastic sheet material can be bonded to the face surfaces of the foam core with a suitable adhesive. This can be done after the foam core is formed, or while the foam is setting-up, the face layers in that instance acting as confining members together with the backing plates 25, 25' to form a simple mold.

In order that the foam core or structural sandwich structure produced may be utilized without further modification at the building construction site, it is preferable that the sandwich panels be detailed as part of the process of fabrication. By detailing is meant to provide in the panel edge surfaces complementary configurations adapted to receive bottom plates or top plates designed to accommodate ceiling or roof panels, or other structural members. To accomplish this, the backing plates 25, 25' are adapted to receive detachable die members 34, 36 of the proper geometrical configuration. Thus, as the foam hardens about the dies, the proper details are present in the core edge surfaces. This is shown in FIG. 2 where a groove die plate 34 is detachable mounted on the backing plate 25 by pin members 42 which fit into receiving slots 44 in the backing plate 25. Similarly, tongue die plate 36, has on the rear thereof pin members 42' which fit into receiving slots 44' in the corresponding backing plate 25'. The die plates have central holes 38, 38' therein, enabling the die plates to be slipped over the lateral half mandrels 30, 30' which protrude therethrough. It is seen that the die plates 34, 36 have edge notches 40, 40' so a plurality may be fitted together to form a composite die member. The tongue and groove combination shown in FIG. 2 is of extreme value where the panels are to be used for floor or ceiling panels. Where slots adapted to receive splines are desired, the dies to be mounted on the backing plates can be of identical configuration. Other types of detail as desired may be achieved by the proper selection of die configuration. Here again the dies are treated with mold release material, in order to insure proper release from the foam core at the end of the process.

There is shown in FIG. 3, an apparatus for fabrication of continuous structural sandwich constructions or panels, having regular, predetermined, interconnecting channels therein. To form a sandwich panel, a spray nozzle 50 is seen to inject plastic foam between top and bottom layers 52, 54 of surface sheet material delivered from rolls. The foam can be made by many methods, such as whipping air into a solution or suspension of plastic, dissolving gas in a plastic mix which is caused to foam when the pressure is reduced, producing carbon dioxide within the foam mass by chemical reaction, and other methods described in chapter 12, Cellular Plastics, of Plastic Engineering Handbook, cited supra, all of which are well known to those skilled in the art.

The apparatus comprises a pair of endless belts which drive a plurality of chain connected moveable half-mandrels in butting relationship, which move in sliding relation over the outer surface of a plurality of fixed mandrels in angular relationship to the moving half-mandrels. The moveable mandrels carry backing plates adapted to receive detailing dies, as previously described, which together with the upper and lower facing sheets and their guide plates form a mold into which the foam plastic is sprayed. An adhesive coating can be applied to the face layers to assure adhesion to the foam core, or as in the case of some plastic foams, such as polystyrene, for example, a thermosetting resin can be blended with the plastic material before charging or spraying into the mold. The foam sets up around the mandrels as it is moved along together with the face layers. By the time the foam is tack free, the foam sandwich core is removed from the fixed mandrels, and the moveable mandrels are removed from the foam core. The foam core thereby has passageways corresponding with the former position of the mandrel structure. The moveable half-mandrels, are then dipped in a mold release compound bath and reintroduced in a touching relationship with the fixed mandrels, whereby the moveable mandrels encompass and slide along the outer periphery of the fixed mandrels to repeat the cycle. Other means are provided for coating the longitudinal mandrels with mold release compound, if required. If desired, the sandwich can be passed through heating means to set the foam, and thereafter cut to desired sizes by band saws, or where the outer face layers permit, a hot electric wire, or other means.

A pair of parallel, longitudinal mandrel members 60, 62 are arranged intermediate the upper and lower face layers 52, 54, which themselves are arranged between the upper and lower face layer guide plates 58, 59. The upper face layer guide plate 58 is seen to contain perforations 51 which are covered by a vacuum manifold apparatus 53, thereby providing a slight vacuum to keep the upper face layer 52 against the plate 58 while the injected foam is filling the void. The mandrels 60, 62 extend an intermediate but finite distance into the apparatus, and at the frontal end of each mandrel is seen to be arranged a pair of spaced, tapered pin seats. Thus, as shown in FIG. 4 in the first mandrel 60 are found a first pin seat 64 and a second pin seat 66, and similarly, as best seen in FIG. 3 in the second mandrel 62 contains a first pin seat 68 and a second pin seat 70. Extending downwardly from a first retainer control box 72 are a first mandrel pin 76 and a second mandrel pin 78, which are adapted to fit into the first mandrel first pin seat 64 and the first mandrel second pin seat 66 respectively. Similarly, a second retainer control box 74 is associated with a second mandrel 62, and extending downwardly therefrom are a first mandrel pin 80 and a second mandrel pin 82, which fit in the second mandrel first pin seat 68 and the second mandrel second pin seat 70 respectively. The operation of the retainer control boxes, and mandrel pins will be discussed in more detail hereinafter in connection with FIG. 6, but it is seen that at least one of the pins associated with each mandrel is engaged in the pin seat thereof at all times, thereby holding the mandrels fixedly in position. Although only two pins are seen extending downwardly from each control box, a larger number may be utilized to provide improved rigidity of the stationary longitudinal mandrels against axial movement.

Associated with the longitudinal mandrels 60, 62 are a plurality of lateral mandrels 85 which each comprise a pair of half mandrels 86, 88 which are adapted to fit in end-to-end butting relationship. These mandrels 85 are slidably mounted in bushings 99 which are connected together by a chain 87 and are driven by a continuous belt 84 which in turn is driven by a roller 83 connected to a primary drive motor 55 through reduction gear 56. The drive motor 55 is also seen to energize the retainer control box mechanisms 72, 74 through reduction gear 57. Of course, the retainer control boxes could be driven by a separate means from that driving the mandrel belt, while alternately, the same or an additional motor could be used to provide rotational power to the face layer rolls 52, 54 if required. Each lateral half mandrel has a hole in the intermediate portion thereof, said left lateral half mandrel 86 containing an opening 90 enabling the half mandrel to snugly encompass the periphery of the first longitudinal mandrel 60 and slide along the outer periphery thereof while driven along by the moving endless belt 84. Similarly, the right lateral half-mandrel 88 contains an opening 92 enabling it to snugly encompass and slide along the outer periphery of the second longitudinal mandrel 62. As discussed in connection with FIG. 2, the holes 90, 92 could contain Teflon bushings where wear was considered to be a problem. It is further seen that sleeves 94 arranged at the outer ends of each lateral half mandrel, said sleeves carrying a pair of guide rollers 96, 98 thereon which engage a T-bar guide track 100. The guide track is seen to curve outwardly and downwardly in the region of the apparatus where the longitudinal mandrels 60, 62 terminate, for a purpose to be later explained.

In operation the foam is sprayed in around the mandrel structure and the belt 84 moves the chain 87 carrying the lateral mandrels 85 to the point where they engage the longitudinal mandrels 60, 62. As best seen in FIG. 4 which illustrates the interaction of the left lateral mandrel 86 and the left longitudinal mandrel 60, the lateral half-mandrel 86 engages the longitudinal mandrel 60 at the tip thereof, the lateral mandrel encompassing the outer periphery of the longitudinal mandrel which passes through the central hole 90 therein. The lateral mandrel 86 is moved along the outer periphery of the longitudinal mandrel, the retainer control box 72 being synchronized so that the first pin 76 is lifted clear of the corresponding pin seat 64 so that the lateral half mandrel can pass over it. Nonetheless, as the lateral half-mandrel is passing over the first pin seat 64, the second pin 78 is firmly engaged in the second pin seat 66 so that the longitudinal mandrel is firmly locked in place and not susceptible to motion. Similarly, when the half-mandrel is passing over the second pin seat 78, the first pin 76 is firmly engaged in the corresponding pin seat 64. Such an action is simple to achieve with the proper selection of interlocking gear means 104 to which are attached cam members 106 which are programmed to actuate the pins 76, 78 at the proper time, the pins being aided in returning to a position free of the corresponding pin seat by spring members 108. Of course, a similar apparatus is used to permit the passage of the right lateral half-mandrel 88 along the right longitudinal mandrel 62.

Returning to FIG. 3, as the lateral mandrels are moved along the longitudinal mandrels, the foam sets up about the mandrel structure between the face layer sheets which are adhered to the foam by an adhesive, applied separately or contained as part of the foam mix. The rate of motion chosen is such that any particular point of the foam core becomes tack-free at about the time it reaches the end of the longitudinal mandrel which is disposed internally within the apparatus. The foam core at that point is then moved off the longitudinal mandrels. At this point the lateral half-mandrel 85, the guide rollers of which 96, 98 are riding along the T-bar track 100 reach the portion of the track which curves outwardly and downwardly, thereby pulling the lateral half mandrels 86, 88 through the bushings 99 and out of the foam core. This provides a sandwich structure with a core having voids therein which are interconnecting and regular, being of the shape and dimensions of the mandrels. The lateral mandrels 85 are moved on the chain 87 downwardly through the mold release bath 102 where they are recoated and the cycle repeated. The structural sandwich construction 10 however has moved on to a dielectric or other heater 110 if required, and thereupon to means, not shown, for cutting into useable lengths.

The lateral half-mandrels can be withdrawn from the foam core by hydraulic, magnetic, pneumatic, or other means, where it is inconvenient to have a curved T-bar track. A scraping mechanism can be employed to clean the lateral mandrels when they are withdrawn from the foam core where the mold release compound does not prove entirely adequate.

It should particularly be noted that essentially the same apparatus can be utilized for making foam cores alone, where it might be desirable to provide face layers later applied by hand methods, or sprayed on, for example. To prepare only the foam core, the face layer rolls 52, 54 are removed. The face layer guide plates 58, 59 and the lateral mandrel backing plates 93, which are adapted to receive detailing dies, if suitably coated with mold release compound, serve as a mold into which the foamed plastic is confined. The operation of the apparatus would be similar in other respects to that where the end product was a structural sandwich construction.

The processes described in the patent to Aykanian, No. 2,962,407, issued Nov. 29, 1960, can be modified to incorporate the method and structure of my invention so long as my mandrel structure and related operations are employed. My process and apparatus can also be used where the foam core is not made of rigid foam, such as shown in the patent to Touhey, No. 3,012,284, issued Dec. 12, 1961.

If difficulty is experienced in removing the foam core from the longitudinal mandrels, or the lateral mandrels from the foam core, it is possible to improve the distribution of mold release material, if in a fluid state, over the mandrels by utilization of an internal pressurization system.

As shown in FIG. 5, the longitudinal mandrels contain hollow passageways 114 for the flow of mold release compound to the outer surface of the mandrels through the orifices 116, 118. The mold release fluid 103 is drawn from the mold release bath 102 through conduit 112 by a pump 111 which in turn distributes the fluid to the mandrel retainer pins 76, 78 through flow lines 113. The mandrel retainer pins contain a passageway therein (not shown) which connects with the flow lines, the passageway in the lower portion of the pin terminating in a plurality of orifices in the region where the pin nests in the pin seats 64, 66, said orifices being contiguous with said mandrel passageways 114. Thus, in operation, small quantities of mold release fluid 102, such as a silicone fluid, will be pumped from the mold release bath 103 and then distributed to the several mandrel pins 76, 78 by the means described. By utilization of ball check valves in the pin seats or other means (not shown) fluid may be injected in the longitudinal mandrel passageways 114 from the mandrel pins 76, 78, but only at the time said pins nest in their respective pin seat 64, 66. Thus, fluid will flow from the orifices 116, 118 to continuously coat the mandrel surfaces with mold release fluid. A similar system may be used for the lateral half-mandrels, however, the conduit 113 would be flexible in nature in order to accommodate the movement of the lateral mandrels 85 in relation to the fixed mandrels 60, 62.

When my invention is used for the production of structural sandwich constructions, it is desirable that the process be completely continuous, so provision must be made to supply additional face layer sheets without shut-down when the upper and lower cover rolls initially used have been exhausted. There are many ways to accomplish this but one means is shown in FIG. 6. Here, a plurality of face layer rolls 120, 122, 124, 126 are individually mounted on arms of a spider 128 which is arranged on mounting frame 130. The spider 128 is rotatably mounted on the frame 130 by means of a shaft 132 which is journaled in the endplates of the spider 128, and which extends outwardly beyond the spider endplate to terminate in a shaft gear 134. The shaft gear 134 engages output gear 136 mounted on electric motor 138 which is energized by relay box 146 mounted on the casing thereof in response to signals received from a switch member 140. Extending outwardly from the switch member 140 is a feeler arm 142 to which is attached roll rider wheel 144.

In operation, the face layer material is taken from the first roll 120 to form the face layer of the structural sandwich construction in accordance with the process and apparatus described previously. The rider wheel 144 on feeler arm 142 rides along the outer periphery of the roll 120 until it is extended a predetermined distance which indicates that the rolls are nearing depletion. At such time, the arm closes an electrical circuit in the switch 140, thereby actuating the relay box 146 through control wiring 148 and cause the motor 138 to rotate. Power is transmitted to the spider shaft 132 through gears 134, 136 until the spider has rotated one quarter revolution or 90 degrees and brought the next face sheet roll 122 to the position formerly occupied by the first face sheet roll 120 which has now moved to the position formerly occupied by the last face sheet roll 126, where it can be reloaded by an operator. Although, in the apparatus shown, the operator would manually move the feeler arm 142 and rider wheel 144 out of the way of the oncoming face layer roll 122, provision for automatic control could be made. Alternatively, other monitoring means could be utilized instead of the rider wheel, such as, for example, a photoelectric cell and light beam combination which would indicate when the face layer roll was depleted, and actuate the change cycle. While apparatus for only the top face layer has been illustrated, it is obvious that an identical arrangement may be provided for the bottom layer of face material. Similarly, practically any number of rolls can be employed in the change over system, the angular rotation of the spider normally being limited to an angular rotation in degrees equal to 360 divided by the number of equally spaced rolls.

It is not essential that face layer material storable on rolls be used when structural sandwich constructions are desired. As one alternative, face layer material is sprayed on. Also, it might be desired to provide face layers of material such as plywood which does not readily lend itself to storage on rolls. In that instance, in order to provide continuous operation of the process and machinery, sheets of face layer material are stacked for ultimate placement as upper and lower face layers. A single stacking mechanism, with alternate feed of sheets to the top and lower surfaces of the foam core respectively, can be utilized. Alternatively, separate stacks of sheets for upper and lower layers can be employed. Feed mechanism is synchronized with the movement of the foam core, and layer sheets are fed to the core in a manner whereby members of the same face layer are contiguous to one another. Such apparatus is well within the skill of the average practitioner in the art.

Having described the invention in what are considered to be preferred embodiments thereof, it is to be understood that the specific details shown are merely illustrative, and that the invention may be carried out by other means. Accordingly, it is to be understood that the scope of this invention is limited only by the scope of the appended claims.

I claim:
1. A method of making a composite sandwich panel having regular voids therein comprising spraying a plastic foam about a fixed mandrel means and a moveable mandrel means which moves continuously in relation to said fixed mandrel means and in touching relation thereto, said fixed and moveable mandrel means being arranged in a void between moving face layers of said composite panel, removing the foam core from said fixed mandrel means, and removing said moveable mandrel means from said core.

2. A method of fabricating a composite sandwich panel structure having face layers and a plastic foam core with voids in said core in regular arrangement, comprising, placing plastic foam about a mandrel structure arranged between and in spaced relation to said face layers, said mandrel structure being adapted to be stationary in part, and moveable in part, said moveable and stationary portions being in touching relationship; continuously moving together said face layers, said foam core, and said moveable portion of said mandrel relative to said stationary portion until said foam core has become tack-free; and removing said moveable mandrel part from said core, and said core from said stationary mandrel part.

3. The method of claim 2, and in addition, the step of heating said sandwich panel structure having face layers and a plastic foam core.

4. A method of fabricating in continuous lengths foam core having regular intersecting passageways therein comprising the steps of: placing a foamable composition about a mandrel structure in a confined space, said mandrel structure being relatively stationary in part and relatively moveable in part, said moveable and stationary parts being in touching relationship; moving together said foam core and said moveable mandrel part relative to said stationary mandrel part until said foam has become tack-free; and removing said moveable mandrel from said foam core, and said foam core from said stationary mandrel.

5. A continuous method for preparing structural sandwich construction having regular and intersecting passageways in the core thereof, which comprises the steps of continuously moving two flat substantially parallel sheets of covering material through a die defined by two flat substantially parallel surfaces; providing elongated, substantially parallel side guides which project from the first of said parallel surfaces to the second of said parallel surfaces, said parallel surfaces and side guides defining an elongated open-ended chamber; arranging a composite mandrel structure in the void defined by said two flat substantially parallel sheets of covering material and said parallel side guides, said mandrel structure comprising a number of elements which are relatively stationary in part and a number of elements which are relatively moveable in part, said moveable elements being in touching relation to said stationary elements at the outer periphery thereof and in encompassing relation therewith, said moveable mandrel elements being slidably connected to said parallel side guides; depositing a plastic foam composition substantially uniformly over the surface of the bottom covering sheet and about said mandrel structure and in a quantity such that the plastic foam will substantially completely fill the elongated open-ended chamber; moving together said parallel sheets of covering material, said foam core and said moveable mandrel elements relative to said stationary mandrel elements until said foam core has become tack-free; removing said structural sandwich construction from said stationary mandrel elements; and removing said moveable mandrel elements from said foam core.

6. A method as set forth in claim 5 and in addition the step of arranging die members on said parallel side guides so that predetermined geometric configurations are detailed in the lateral edges of said foam core.

7. In an apparatus for fabricating in continuous lengths foam cores with regular interconnecting and prearranged voids therein, the combination of: fixed mandrel means, other mandrel means adapted to be continuously moveable in relation to said fixed mandrel means and in touching relation therewith, and means for injecting plastic foam about said fixed and moveable mandrel means, whereby said foam core has regular voids therein some of which are substantially parallel and some of which are substantially normal to each other.

8. In an apparatus for fabricating in continuous lengths a sandwich panel with a foam core having regular, interconnecting and prearranged passageways therein, the combination of: fixed mandrel means; moveable mandrel means adapted to continuously traverse said fixed mandrel means in touching relationship about the outer periphery thereof; means for providing face layer material above and below said fixed and moveable mandrel means; and means for injecting plastic foam about said fixed and moveable mandrel means between said face layer material.

9. Apparatus for fabricating in continuous lengths foam core members having regular intersecting passageways therein comprising: upper and lower confinement means; a first plurality of mandrels extending a finite distance between said upper and lower confinement means; a second plurality of regularly spaced mandrels, each of which is in two linear half-portions in end-butting relationship, and each half portion of which has centrally disposed therein at least one bore which is adapted to encompass the outer periphery of a corresponding first mandrel in snug-fitting slideable relationship; a first and second continuous chain, the first of which interconnects all the individual left half section members of said second plurality of spaced mandrels, and the second of which interconnects all the individual right half section members of said second plurality of spaced mandrels; a first and second continuous belt together moving in a repetitive cycle said second plurality of regularly spaced mandrels interconnected by said first and second chain; guide roller means arranged on the end portions of said second mandrel half sections; first track and second track means engaging said guide roller means, said track means being generally parallel to said first plurality of mandrels and extending outwardly and downwardly in the vicinity of the ends of first plurality of mandrels of finite length, said first and second track means forming continuous loops; means adapted to contain a mold release material fluid bath through which said first and second track means cause said half section mandrel members to pass; said mandrel half sections having attached thereto backing plates, said plates together with said upper and lower confinement means forming a mold; means for injecting plastic foam into said mold and about said first and second plurality of mandrels; means for holding said first plurality of mandrels against axial movement; and means for moving said half mandrel sections along the outer periphery of said first plurality of mandrels of finite length.

10. The apparatus described in claim 9, and in addition, means for providing face layer material, and means for adhering upper and lower face layer material to said plastic foam core to form a structural sandwich construction.

11. The apparatus described in claim 10, and in addition die members of appropriate geometric configuration attached to the inner surfaces of said backing plates, whereby detailing is provided in the edge surfaces of said plastic foam core product.

12. The apparatus described in claim 11, and in addition means for heating said structural sandwich construction for a predetermined time at a predetermined temperature.

13. In combination: means for fabricating in continuous lengths a foam core; means for providing regular intersecting passageways in said foam core during said fabrication; means for continuously providing face layer material to said foam core fabrication means; and means for adhering said face layer material to the upper and lower surfaces of said foam core, whereby a structural sandwich construction having interior passageways located therein adapted to receive utility line and serve as heating and ventilating ducts, or the like, is produced.

14. A device as described in claim 13 wherein said means for continuously providing face layer material to said foam core fabrication means comprises: means for mounting a plurality of face layer rolls thereon substantially equidistant from one another, means for rotating said mounting means, means for controlling the cycle of operation of said rotating means, means for sensing the imminent depletion of material upon one of said face layer rolls on said mounting means, said sensing means being operatively associated with said control means, whereby imminent depletion of one of said face layer rolls is determined by said sensing means thereby actuating said control means to cause said rotating means to turn said mounting means an angular rotation equal to 360 degrees divided by the number of face layer rolls in said plurality mounted thereon.

15. Apparatus as described in claim 9 wherein said means for holding said first plurality of mandrels against axial movement comprises a plurality of pin seats arranged in each of said mandrels, and a retainer control box associated with each of said mandrels, said retainer control box comprising cam means, pin members equal in number to said pin seats distending from said control box in the general direction of said pin seats, said cam means controlling the reciprocating motion of said pin members in and out of said pin seats, and cam control means arranged within said control box whereby said pin members are moved in and out of said mandrel pin seats in an alternate manner to provide engagement of at least one pin member in a corresponding pin seat during the interval that said second plurality mandrel half sections are passing over other pin seats, and other pin member being disengaged.

16. Apparatus as described in claim 15 and in addition, a system for providing mold release fluid to the outer surface of said first plurality of mandrels of finite length comprising, a centrally disposed channel throughout each of said mandrels connecting to said pin seats in each mandrel and terminating in a plurality of orifices on the outer surface of said mandrels; pump means having an intake and a discharge portion, said intake portion being associated with said mold release fluid bath container and said discharge portion being connected to said pin members, each of said pin members having a centrally disposed passageway therein adapted to receive fluid flow, each of said passageways terminating in a plurality of orifices at that portion of said pin member adapted to meet in said pin seat, said pin orifices being in contiguous relation to said centrally disposed mandrel channels.

17. A device as described in claim 9, and in addition, means associated with said upper confinement means for reducing the pressure below atmospheric pressure in the vicinity of said upper confinement means.

18. In an apparatus for fabricating continuous lengths of foam cores having regular passageways therein by foam injection within a confined mold, the improvement comprising:

(a) fixed mandrel means of finite length within said mold; and (b) other mandrel means within said mold adapted to be continuously moveable in relation to said fixed mandrel means and in touching relation therewith.

19. The improvement of claim 18 wherein said other mandrel means is adapted to move along the outer periphery of said fixed mandrel means in encompassing relationship therewith.

20. The improvement of claim 18, and in addition die means for detailing the foam core edge surfaces, said die means being attached to said movable mandrel means.

References Cited by the Examiner

UNITED STATES PATENTS

| | | | |
|---|---|---|---|
| 1,464,360 | 8/1923 | Hicks | 156—46 |
| 1,469,820 | 10/1923 | Ruby | 22—99 |
| 1,539,303 | 5/1925 | Debay | 25—99 |
| 1,642,564 | 9/1927 | Smith | 25—99 |
| 2,079,393 | 5/1937 | Benge | 18—45 |
| 2,260,081 | 10/1941 | Lefebure et al. | 156—39 |
| 2,549,912 | 4/1951 | Lindsay | 242—64 |
| 2,658,691 | 11/1953 | Mallory | 242—64 |
| 2,806,812 | 9/1957 | Merz | 161—161 XR |
| 2,931,063 | 4/1960 | Harris | 18—4 |
| 2,970,343 | 2/1961 | Johnson et al. | 18—45 |
| 3,000,144 | 9/1961 | Kitson. | |
| 3,030,687 | 4/1962 | Muspratt | 264—71 |
| 3,076,226 | 2/1963 | Bonton et al. | 18—4 |
| 3,137,743 | 6/1964 | Pelley | 264—47 XR |

FOREIGN PATENTS 1,262,090    4/1961    France.

ALEXANDER H. BRODMERKEL, *Primary Examiner.*

MORRIS LIEBMAN, *Examiner.*

P. E. ANDERSON, *Assistant Examiner.*